(No Model.)

E. A. LOUGEE.
ROPE CLAMP.

No. 566,404. Patented Aug. 25, 1896.

Witnesses
E. H. Monroe.
V. B. Hillyard.

Inventor
Edwin A. Lougee.

By his Attorneys.
C. A. Snow & Co.

UNITED STATES PATENT OFFICE.

EDWIN ALPHONZO LOUGEE, OF HAVERHILL, MASSACHUSETTS.

ROPE-CLAMP.

SPECIFICATION forming part of Letters Patent No. 566,404, dated August 25, 1896.

Application filed July 9, 1895. Serial No. 555,393. (No model.)

*To all whom it may concern:*

Be it known that I, EDWIN ALPHONZO LOUGEE, a citizen of the United States, residing at Haverhill, in the county of Essex and State of Massachusetts, have invented a new and useful Rope and Line Clamp, of which the following is a specification.

This invention aims to provide a fastener for lines, ropes, cords, &c., which can be used indiscriminately as a right or left hand fastener, and which can be manipulated by operating the rope or line properly, so as to release or grip the rope or line, as required, and by the use of one hand.

With these and like objects in view the invention consists, primarily, of a relatively-fixed arm having a clamping-head and a pivoted or swinging hook to coöperate with the clamping-head, so as to grip the rope or line from either side.

The improvement also consists of the novel features which hereinafter will be more particularly set forth and claimed and which are shown in the accompanying drawings, in which—

Figure 1:
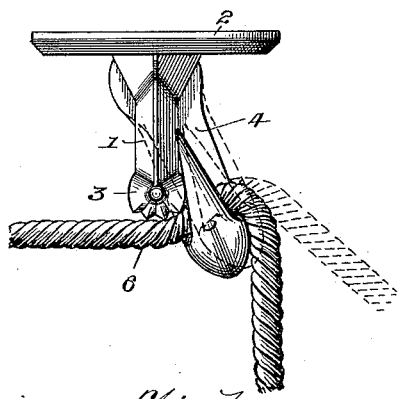
Figure 2:
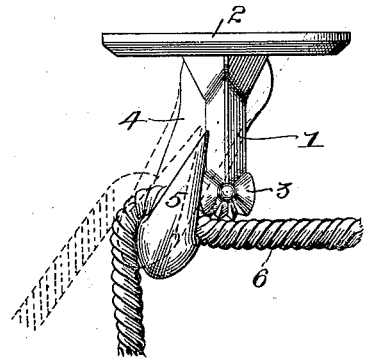
Figure 3:
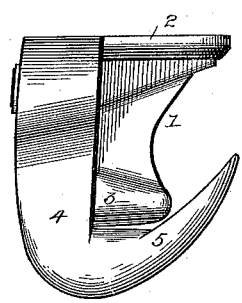
Figure 4:
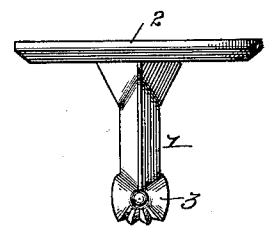
Figure 5:
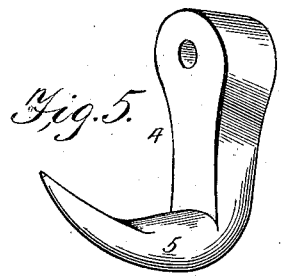

Figure 1 is a front elevation of a fastener embodying the substance of the present invention, the dotted lines showing the manner of releasing the rope or line. Fig. 2 is a view similar to Fig. 1, showing the application of the invention for securing a rope or line extending in an opposite direction to the rope or line shown in Fig. 1. Fig. 3 is a side elevation of the device. Fig. 4 is a front view of the relatively-fixed arm disassociated from the pivoted hook. Fig. 5 is a detail perspective view of the hook.

The arm 1 is designed to be fixedly attached to a suitable support in any convenient manner, and for this purpose is shown provided at its upper end with a plate 2, which is apertured to receive screws or like fastenings, by means of which the fastener is secured to the support or structure to which it is required to attach the device. A clamping-head 3 is formed at the lower end of the arm 1 and is approximately of a conoidal shape, the smaller end pointing outward and the sides extending an equal distance upon each side of the arm. In order to prevent accidental slipping of the rope or line, the lower portion of the clamping-head is grooved or corrugated, so as to bite into the rope and grip the same firmly between the clamping-head 3 and the bill of the pivoted hook 4.

The hook 4 is sufficiently stout so as to withstand the strain to which this class of fasteners is subjected when in efficient service, and it is pivoted at its upper end to the rear side of the arm 1, so that its bill 5 will come beneath and project in front of the clamping-head 3. That portion of the bill immediately opposite the clamping-head 3 is massive, so as to stand the wear incident to the sliding of the rope or line thereover and to sustain the stress imposed thereon without giving way. This hook is adapted to swing to either side of the arm 1, so as to grip the rope or line 6, whether it approaches from the right or the left, as clearly indicated in Figs. 1 and 2. When it is required to release or tighten the rope or line, the latter is pulled in an opposite direction to that from which the said rope or line extends, thereby causing the hook to swing to that side of the arm to which the free end of the rope or line is pulled. The operation will be the same to fasten the rope or line to the right or the left of the arm 1, and it is evident that the operation can be effected by the use of one hand only.

Various changes in the form, proportion, and the minor details of construction may be resorted to without departing from the principle or sacrificing any of the advantages of this invention.

Having thus described the invention, what is claimed as new is—

1. An arm having a clamping-head at one end and constructed to be rigidly secured to a stationary support at its opposite end, in combination with a hook having pivotal connection with the rear face of the said arm at a distance from its clamping-head, and having its bill extending across and up in front of the clamping-head and adapted to swing freely to either side thereof and to be moved to and from an operative position in a positive manner by means of the line, substantially in the manner set forth.

2. A line-fastener consisting of an arm having a plate at one end apertured to receive fastenings for rigidly securing the device to a stationary support, and having a conoidal-shaped clamping-head at its opposite end corrugated on its outer side, and a hook having pivotal connection with the rear face of the arm and having its bill extending across the outer side and up in front of the clamping-head, and adapted to swing freely to either side thereof and to be moved positively in either direction to or from an operative position by a pull upon the line, and having that portion of the bill immediately opposite the clamping-head made massive, substantially as shown for the purpose described.

In testimony that I claim the foregoing as my own I have hereto affixed my signature in the presence of two witnesses.

EDWIN ALPHONZO LOUGEE.

Witnesses:
E. M. COURSER,
H. E. LOUGEE.